(12) United States Patent
Suzuki et al.

(10) Patent No.: US 11,048,830 B2
(45) Date of Patent: Jun. 29, 2021

(54) ASSISTANCE SYSTEM, DESIGN ASSISTANCE APPARATUS, AND NON-TRANSITORY COMPUTER READABLE MEDIUM STORING DESIGN ASSISTANCE PROGRAM

(71) Applicant: FUJIFILM BUSINESS INNOVATION CORP., Tokyo (JP)

(72) Inventors: Takahiro Suzuki, Kanagawa (JP); Shinji Kawabata, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 157 days.

(21) Appl. No.: 16/182,773

(22) Filed: Nov. 7, 2018

(65) Prior Publication Data
US 2019/0155964 A1     May 23, 2019

(30) Foreign Application Priority Data
Nov. 21, 2017   (JP) ............................. JP2017-223687

(51) Int. Cl.
  *G06F 30/00*    (2020.01)
  *G06F 30/17*    (2020.01)
  G06F 3/0481     (2013.01)
  G06F 111/02     (2020.01)
  G06F 111/20     (2020.01)

(52) U.S. Cl.
  CPC ............. *G06F 30/00* (2020.01); *G06F 30/17* (2020.01); *G06F 3/04815* (2013.01); *G06F 2111/02* (2020.01); *G06F 2111/20* (2020.01)

(58) Field of Classification Search
  CPC ...................... G06F 2111/02; G06F 2111/20
  See application file for complete search history.

(56) References Cited

U.S. PATENT DOCUMENTS

| 8,065,289 B2 | 11/2011 | Furumoto et al. | |
| 2008/0313151 A1* | 12/2008 | Furumoto | G06F 16/2458 |
| 2015/0127131 A1* | 5/2015 | Herrman | G05B 19/4097 |
| | | | 700/98 |
| 2016/0098494 A1* | 4/2016 | Webster | G06F 30/00 |
| | | | 703/1 |

(Continued)

FOREIGN PATENT DOCUMENTS

| JP | 2008-262540 A | 10/2008 |
| JP | 2013-097743 A | 5/2013 |

*Primary Examiner* — Brian W Wathen
(74) *Attorney, Agent, or Firm* — Oliff PLC

(57) ABSTRACT

A design assistance system includes a component information management server including an issue/measure information memory that cumulatively stores a component to be used in a design assistance tool, an issue on the component, and a measure to address the issue in association with each other based on inputs from plural design engineers, and a design terminal including an issue/measure display that displays, when a focused component that is the component stored in the issue/measure information memory is displayed on a display screen of the design assistance tool while designing is conducted by using the design assistance tool, an issue on the focused component and a measure to address the issue on the focused component that are received from the component information management server.

7 Claims, 10 Drawing Sheets

(56) References Cited

U.S. PATENT DOCUMENTS

| | | | |
|---|---|---|---|
| 2016/0125108 A1* | 5/2016 | Gupte | G06F 30/23 |
| | | | 703/1 |
| 2016/0246899 A1* | 8/2016 | Hirschtick | G06F 30/17 |
| 2017/0337215 A1* | 11/2017 | Bowman | G06F 16/1794 |
| 2018/0322694 A1* | 11/2018 | Byers | G06F 3/048 |

* cited by examiner

FIG. 3A

| ISSUE ID | COMPONENT NUMBER | DETAILS OF ISSUE | MEASURE ID | DATE OF CREATION |
|---|---|---|---|---|
| I01 | AB012C | CARE SHOULD BE TAKEN FOR DETERIORATION OF PERIPHERY DUE TO HEAT | S01<br>S02<br>S03<br>S04 | 3/1/2017 |
| I02 | FE345A | CARE SHOULD BE TAKEN FOR DEFORMATION DUE TO HEAT OF AB012C | S01 | 4/2/2017 |
| ... | ... | ... | ... | ... |

FIG. 3B

| MEASURE ID | DETAILS OF MEASURE | REMOVAL TARGET COMPONENT NUMBER | ADDITION TARGET COMPONENT NUMBER | APPLIED PRODUCT | LINK TO DETAILS | DATE OF CREATION |
|---|---|---|---|---|---|---|
| S01 | ADD COOLING FAN | | ZZ888A | PRODUCT A | LINK 01 | 3/2/2017 |
| S02 | CHANGE TO SUCCEEDING COMPONENT | AB012C | AB012D | PRODUCT B<br>PRODUCT C | LINK 02<br>LINK 03 | 3/10/2017 |
| S03 | REPLACE WITH COMBINATION OF DIFFERENT COMPONENTS | AB012C | CD333A<br>EF543B<br>GH555A | PRODUCT D | LINK 04 | 4/1/2017 |
| S04 | REPLACE WITH DIFFERENT COMPONENT TOGETHER WITH ADJACENT COMPONENT | AB012C<br>IJ345A | KL666A | PRODUCT E | LINK 05 | 4/10/2017 |
| ... | ... | ... | ... | ... | ... | ... |

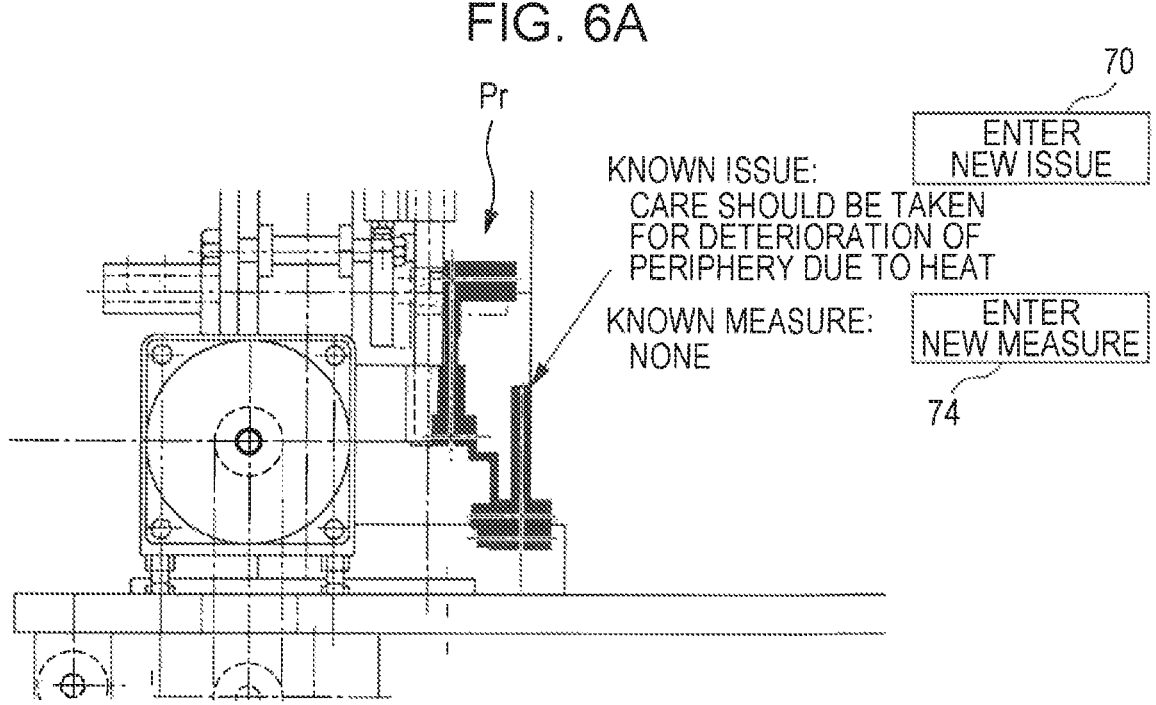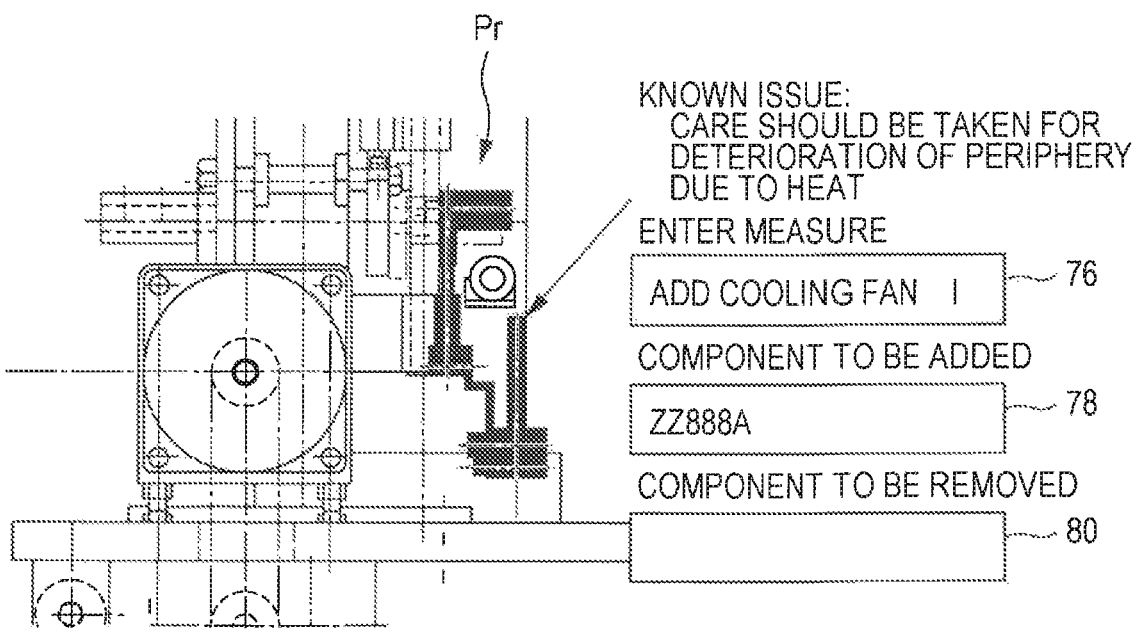

ASSISTANCE SYSTEM, DESIGN ASSISTANCE APPARATUS, AND NON-TRANSITORY COMPUTER READABLE MEDIUM STORING DESIGN ASSISTANCE PROGRAM

CROSS-REFERENCE TO RELATED APPLICATIONS

This application is based on and claims priority under 35 USC 119 from Japanese Patent Application No. 2017-223687 filed Nov. 21, 2017.

BACKGROUND

(i) Technical Field

The present invention relates to a design assistance system, a design assistance apparatus, and a non-transitory computer readable medium storing a design assistance program.

(ii) Related Art

There is known a design assistance tool that assists designing work conducted by a design engineer. Examples of the design assistance tool include a 2D or 3D computer-aided design (CAD) and a software development environment.

Regarding the design assistance tool, there is proposed a technology for sharing problems (issues) found during designing among plural design engineers.

SUMMARY

According to an aspect of the invention, there is provided a design assistance system including a component information management server including an issue/measure information memory that cumulatively stores a component to be used in a design assistance tool, an issue on the component, and a measure to address the issue in association with each other based on inputs from plural design engineers and a design terminal including an issue/measure display that displays, when a focused component that is the component stored in the issue/measure information memory is displayed on a display screen of the design assistance tool while designing is conducted by using the design assistance tool, an issue on the focused component and a measure to address the issue on the focused component that are received from the component information management server.

BRIEF DESCRIPTION OF THE DRAWINGS

An exemplary embodiment of the present invention will be described in detail based on the following figures, wherein:

FIGS. 3A and 3B are conceptual diagrams illustrating examples of an issue table and a measure table included in an issue/measure DB;

FIGS. 6A and 6B illustrate display examples of the screen of the design terminal when a measure to address the issue on the component is input;

DETAILED DESCRIPTION

An exemplary embodiment of the present invention is described below.

Figure 1:
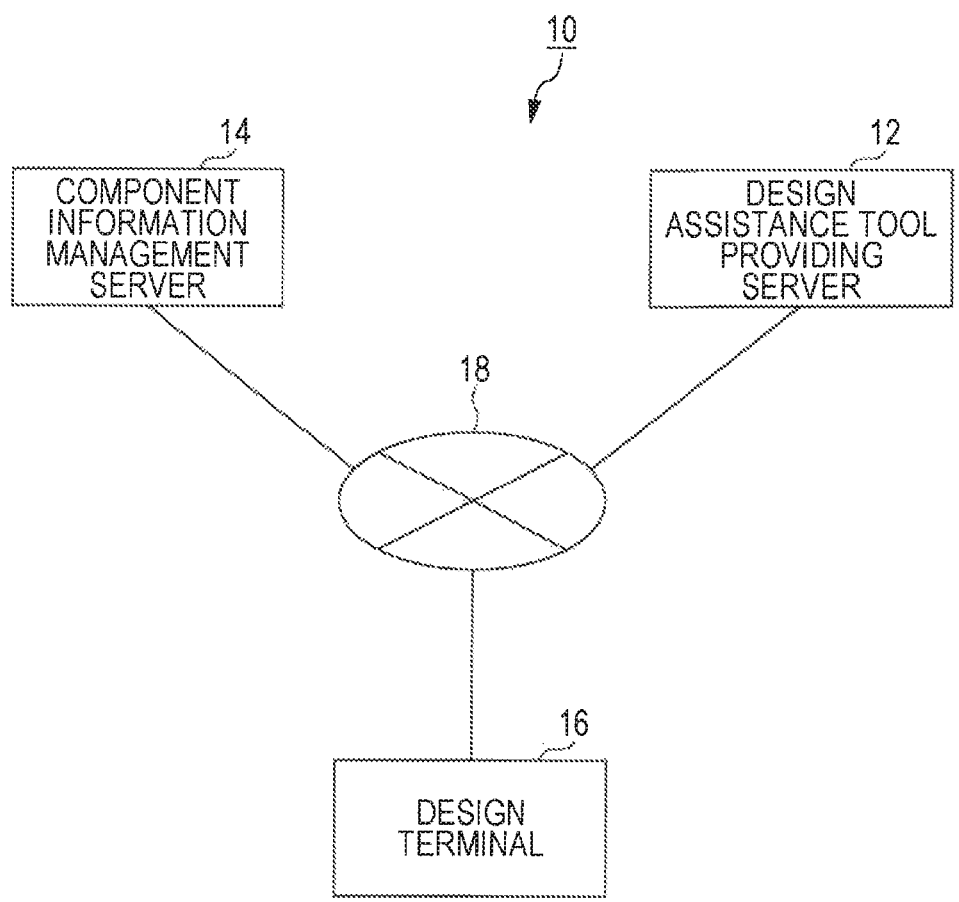
FIG. 1 is a schematic diagram illustrating the configuration of a design assistance system according to an exemplary embodiment.

FIG. 1 is a schematic diagram illustrating the configuration of a design assistance system 10 according to this exemplary embodiment. The design assistance system 10 is a system that provides a design assistance tool for a design engineer. The design assistance system 10 includes a design assistance tool providing server 12, a component information management server 14, and a design terminal 16 that is a terminal to be used by the design engineer. The design assistance tool providing server 12, the component information management server 14, and the design terminal 16 are communicably connected to each other via a communication network 18 such as the Internet or a local area network (LAN). FIG. 1 illustrates one design terminal 16 alone but the design assistance system 10 includes plural design terminals 16 to be used by plural design engineers.

The design assistance tool providing server 12 is a server that provides a design assistance tool for the design terminal 16 (design engineer). In this exemplary embodiment, the design assistance tool providing server 12 provides a 3D CAD for the design engineer as the design assistance tool. That is, in this exemplary embodiment, the design assistance tool providing server 12 is a cloud server that provides a cloud 3D CAD: Specifically, the design engineer who operates the design terminal 16 may use the 3D CAD provided by the design assistance tool providing server 12 (hereinafter referred to simply as "3D CAD") by accessing the design assistance tool providing server 12 with an Internet browser that operates on the design terminal 16. The design assistance tool provided by the design assistance tool providing server 12 is not limited to the 3D CAD but may be a 2D CAD or a software development environment.

The hardware configuration of the design assistance tool providing server 12 may be equivalent to those of general server computers. That is, the design assistance tool providing server 12 includes a controller configured by a central processing unit (CPU) or the like, a storage unit configured by a hard disk drive, a read only memory (ROM), a random access memory (RAM), or the like, and a communication unit configured by a network adapter or like.

Figure 2:
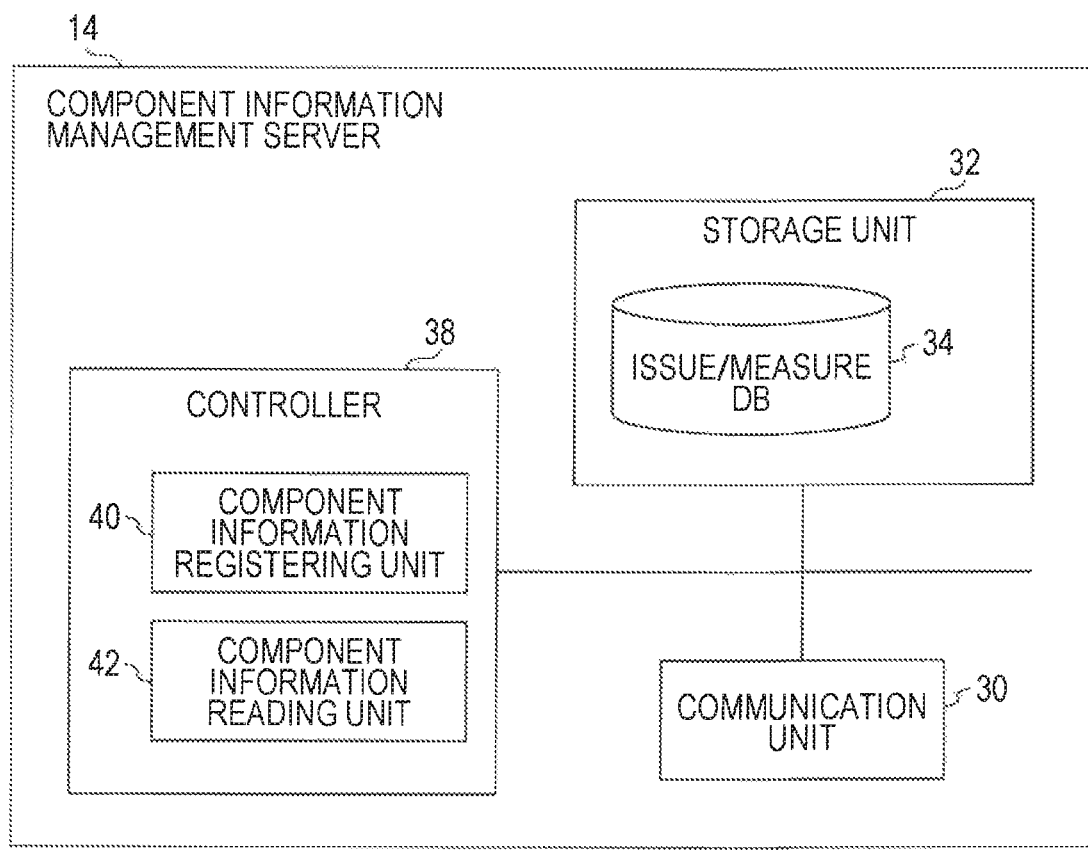
FIG. 2 is a schematic diagram illustrating the configuration of a component information management server according to the exemplary embodiment.

FIG. 2 is a schematic diagram illustrating the configuration of the component information management server 14.

The component information management server 14 is a server that manages component information relating to components to be used in the 3D CAD. As described later in detail, the component information relating to components includes issues on the components and measures to address the issues.

A communication unit 30 is configured by, for example, a network adapter. The communication unit 30 exerts a function of communicating with the design assistance tool providing server 12 and the design terminal 16 via the communication network 18.

A storage unit 32 is configured by, for example, a hard disk drive, a ROM, or a RAM. The storage unit 32 stores a program for operating respective units of the component information management server 14. As illustrated in FIG. 2, the storage unit 32 stores an issue/measure DB 34.

The issue/measure DB 34 cumulatively stores components to be used in the 3D CAD, issues on the components, and measures to address the issues in association with each other. Thus, the storage unit 32 also functions as an issue/measure information memory. FIGS. 3A and 3B illustrate examples of details of the issue/measure DB 34. The issue/measure DB 34 of this exemplary embodiment includes an issue table and a measure table. FIG. 3A illustrates an example of details of the issue table. FIG. 3B illustrates an example of details of the measure table.

As illustrated in FIG. 3A, the issue table stores issue IDs, component numbers, details of issues, measure IDs, and dates of creation in association with each other.

The issue ID is a number (or a symbol; the same applies to other numbers) for uniquely identifying a record in the issue table (that an issue on a component). The issue ID is assigned by a component information registering unit 40 described later when a new record is added to the issue table.

The component number is a number for uniquely identifying a component of the 3D CAD that is registered (stored) in the issue/measure DB 34.

The details of an issue are details of an issue on the component indicated by the component number. The issue on the component includes a problem caused by the component on a different component of a product or a problem cased in the component itself (such as damage or deformation). The issue on the component is also a problem caused by the component on a product that uses the component. For example, details of an issue indicated by an issue ID "I01" show that a component indicated by a component number "AB012C" (the component indicated by the component number is hereinafter referred to simply as a component "AB012C" or the like) generates heat and therefore an issue is registered to show that care should be taken for deterioration of the periphery (structure) due to the heat of the component.

In the issue table of this exemplary embodiment, an issue caused by an issue on a first component may be registered as an issue on a second component. For example, details of an issue indicated by an issue ID "I02" show that an issue on a component "FE345A" that is the second component is registered to show that care should be taken for deformation caused by the heat that is the issue on the component "AB012C" that the first component.

The measure ID is a number for uniquely identifying a measure to address the issue. Details of the measure indicated by each measure ID are registered in the measure table described later.

The date of creation is a date when the record is registered.

Although details are described later, among the pieces of information registered in the issue table, the component number, the details of the issue, and the measure ID are registered based on inputs from plural design engineers who are involved in designing by using the 3D CAD.

As illustrated in FIG. 3B, the measure table stores the measure IDs, details of measures, removal target component numbers, addition target component numbers, applied products, links to details, and dates of creation in association with each other.

As described above, the measure ID is a number uniquely identifying a measure to address the issue registered in the issue table. The measure ID is assigned by the component information registering unit 40 when a new record is added to the measure table.

The details of a measure are details of the measure to address the issue associated with the measure ID in the issue table. The details of the measure include at least one of addition of an addition tar t component and removal of a removal target component. For example, details of a measure indicated by a measure ID "S01" show "ADD COOLING FAN" and details of a measure indicated by a measure ID "S02" show "CHANGE TO SUCCEEDING COMPONENT". The "change" refers to such a measure that the component is removed and then a different component is added. In this exemplary embodiment, the details of the measure include at least one of the addition of an addition target component and the removal of a removal target component but are not limited thereto.

The removal target component number is a component number of a component to be removed by taking the measure shown in the details of the measure. For example, the details of the measure indicated by the measure ID "S01" show "ADD COOLING FAN". Therefore, there is no component to be removed. Thus, the removal target component number of the record is left blank. The details of the measure indicated by the measure ID "S02" show "CHANGE TO SUCCEEDING COMPONENT". Therefore, the component "AB012C" that is a component associated with the measure ID "S02" in the issue table is registered as the component to be removed.

The addition target component number is a component number of a component to be added by taking the measure shown in the de ails of the measure. For example, the details of the measure indicated by the measure ID "S01" show "ADD COOLING FAN", Therefore, a component number "ZZ888A" of the cooling fan is registered as the component number of the component to be added. The details of the measure indicated by the measure ID "S02" show "CHANGE TO SUCCEEDING COMPONENT". Therefore, a component "AB012D" succeeding to the component associated with the measure ID "S02" in the issue table is registered as the component to be added.

The applied product is a number for uniquely identifying a product to which the measure is applied. For example, the measure indicated by the measure ID "S01" is applied to a product A. and the measure indicated by the measure ID "S02" is applied to a product B. The measure IDs "S01" and "S02" are associated with the same issue (issue ID "I01", details of issue: "CARE SHOULD BE TAKEN FOR DETERIORATION OF PERIPHERY DUE TO HEAT"). As in this case, different measures may be taken for the same issue on the same component depending on the product.

The link to details is a number indicating a link to detailed information on the measure, including details of the issue relating to the measure, the reason why the measure is applied, and notes on the measure. Although illustration is omitted from the drawings used herein, a detailed information table is defined in the issue/measure DB 34. In the detailed information table, numbers of the links to details and detailed information on the measures are associated with each other. For example, in the detailed information table, a number "LINK 01" of the link to details associated with the measure ID "S01" is associated with detailed information indicating that the ambient temperature has become a certain degree and therefore a fan having a corresponding size may be necessary.

The date of creation is a date when the record is registered.

Although details are described later, among the pieces of information registered in the measure table, the details of the measure, the removal target component number, the addition target component number, the applied product, and the link to details are registered based on an input from the design engineer who is involved in designing by using the 3D CAD. The detailed information on the measure in the detailed information table is also registered based on an input from the design engineer.

Referring back to FIG. 2, a controller 38 is configured by, for example, a CPU and controls the respective units the component information management server 14 in accordance with the program stored in the storage unit 32. As illustrated in FIG. 2, the controller 38 also functions as the component information registering unit 40 and a component information reading unit 42.

The component information registering unit 40 registers component information in the issue/measure DB 34 based on an input from the design terminal 16 (design engineer). Specifically, the component information registering unit 40 registers the component number, the details of the issue, and the measure ID in the issue table and the details of the measure, the removal target component number, the addition target component number, the applied product, and the link to details in the measure table. The component information registering unit 40 also registers the detailed information on each measure in the detailed information table.

When the component registered in the issue/measure DB 34 is displayed on a display screen of the 3D CAD while the design engineer is involved in designing by using the 3D CAD on the design terminal 16, the component information reading unit 42 reads the component information relating to the component from the issue/measure DB 34. Specifically, the component information reading unit 42 reads the details of the issue and the measure ID from the issue table by setting the component number of the displayed component as a key and also reads the details of the measure, the removal target component number, the addition target component number, and the applied product from the measure table by setting the read measure ID as a key. The component information reading unit 42 also reads the detailed information on the measure from the detailed information table in response to a request from the design engineer while the measure is specified.

Figure 4:
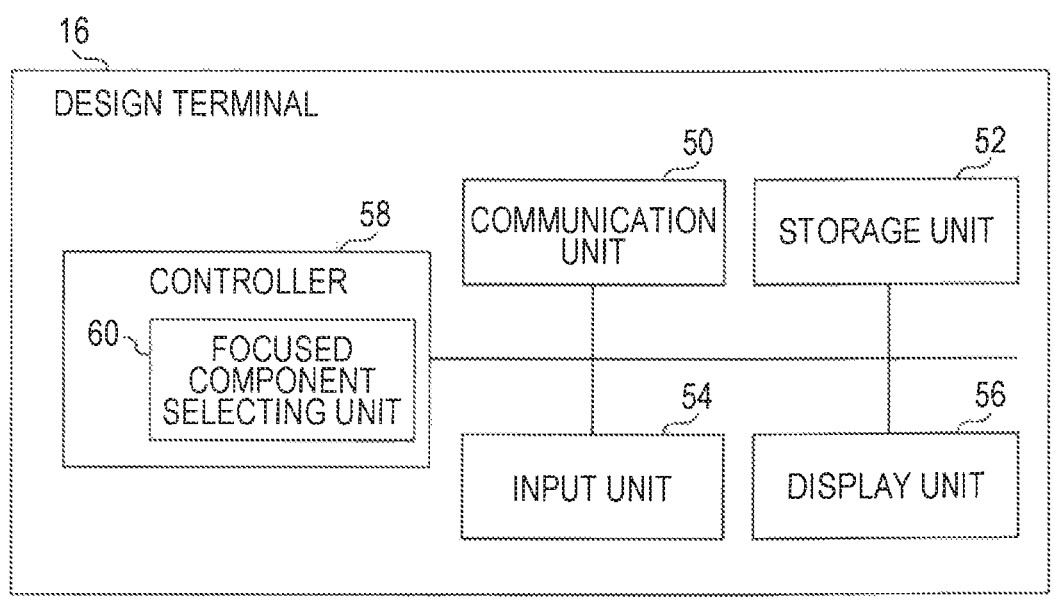
FIG. 4 is a schematic diagram illustrating the configuration of a design terminal according to the exemplary embodiment.

FIG. 4 is a schematic diagram illustrating the configuration of the design terminal 16. The design terminal 16 is, for example, a general personal computer.

A communication unit 50 is configured by, for example, a network adapter and exerts a function of communicating with the design assistance tool providing server 12 and the component information management server 14 via the communication network 18.

A storage unit 52 includes, for example, a hard disk drive, a ROM, or a RAM. The storage unit 52 stores a program for operating respective units of the design terminal 16.

An input unit 54 includes, for example, a mouse or a keyboard and is used for inputting commands from the design engineer for the design terminal 16.

A display unit 56 is configured by, for example, a liquid crystal panel and displays various screens including the display screen of the 3D CAD.

A controller 58 is configured by, for example, a CPU and controls the respective units of the design terminal 16 in accordance with the program stored in the storage unit 52, For example, the controller 58 controls the display unit 56 to display the display screen of the 3D CAD based on information received from the design assistance tool providing server 12 and the component information management server 14. As illustrated in FIG. 4, the controller 58 exerts a function as a focused component selecting unit 50.

The focused component selecting unit 60 selects a focused component from among plural components displayed on the display screen of the 3D CAD that is displayed on the display unit 56. The focused component is such a component that the issue on the component and the measure to address the issue are displayed on the display screen of the 3D CAD.

As the focused component, the focused component selecting unit 50 automatically selects a component on which the design engineer focuses attention presumably. When the design engineer focuses attention on a certain component the design engineer tends to display the component on the 3D CAD under magnification. In view of this tendency, the focused component selecting unit 60 of this exemplary embodiment selects, as the focused component, a component whose display area (number of display pixels) on the display screen of the 3D CAD has become equal to or larger than a predetermined area.

The focused component selecting unit 60 may change the predetermined area in accordance with the size of the component. Since the size differs from one component to another, an extremely small component may be difficult to select as the focused component when a component having an area equal to or larger than the predetermined area that is set uniformly is selected as the focused component. Therefore, the predetermined area may be set smaller for a smaller component and larger for a larger component. When the area of each component has become equal to or larger than the corresponding predetermined area, the focused component selecting unit 60 may select the component as the focused component.

The focused component selecting unit 60 may select the focused component based on the position of the component on the display screen of the 3D CAD. For example, the design engineer may tend to display the focused component near a central position on the display screen of the 3D CAD. Therefore, the focused component selecting unit 60 may select, as the focused component, the component near the central position on the display screen. The focused component selecting unit 60 may select the focused component in consideration of both of the display area and the display position of the component. For example, the focused component selecting unit 60 may select the focused component based on the display area while assigning a greater weight to the area of the component located closer to the center of the display screen.

Alternatively, the focused component selecting unit 60 may select the focused component based on a manual instruction from the design engineer.

Details of the method for inputting the issue on the component and the measure to address the issue on the design terminal 16 are described below with reference to FIG. 5A to FIG. 6B.

Figure 5A:
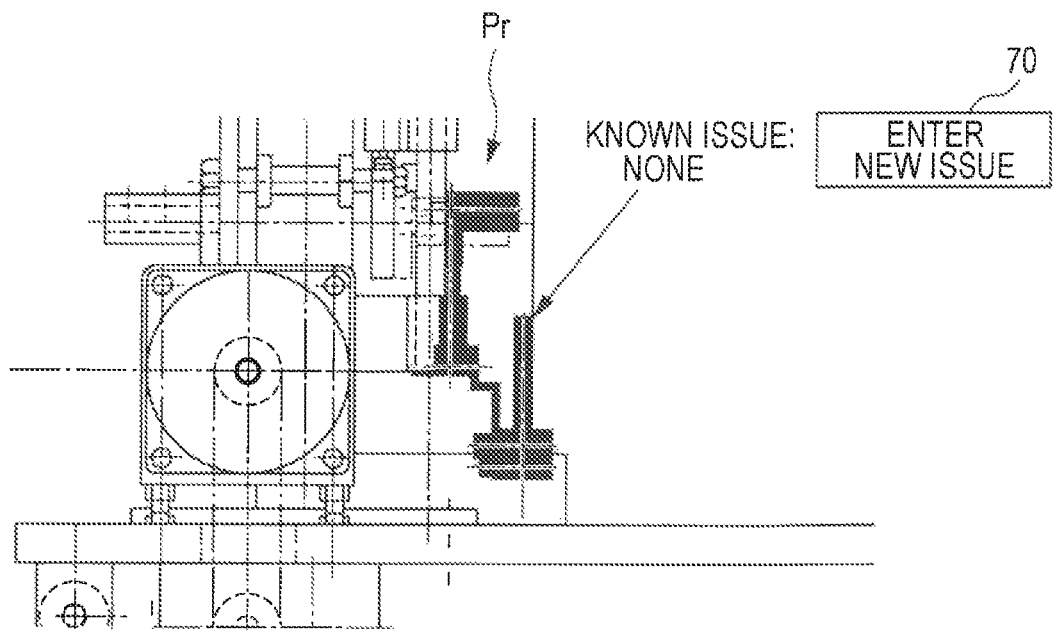
FIGS. 5A and 5B illustrate display examples of a screen of the design terminal when an issue on a component is input.

FIG. 5A illustrates a wart of the display screen of the 3D CAD that is displayed on the display unit 56 when a design engineer A is involved in designing by using the 3D CAD on the design terminal 16. In FIG. 5A, the component colored black is a focused component Pr selected by the focused component selecting unit 60. It is assumed that an issue on the focused component Pr and a measure to address the issue have not been registered in the issue/measure DB 34 yet. In this case, a illustrated in FIG. 5A, the display screen of the 3D CAD shows that there is no known issue on the focused component Pr. In addition, a new issue input button 70 is displayed on the display screen of the 3D CAD so as to allow the design engineer A to input a new issue on the focused component Pr.

Figure 5B:
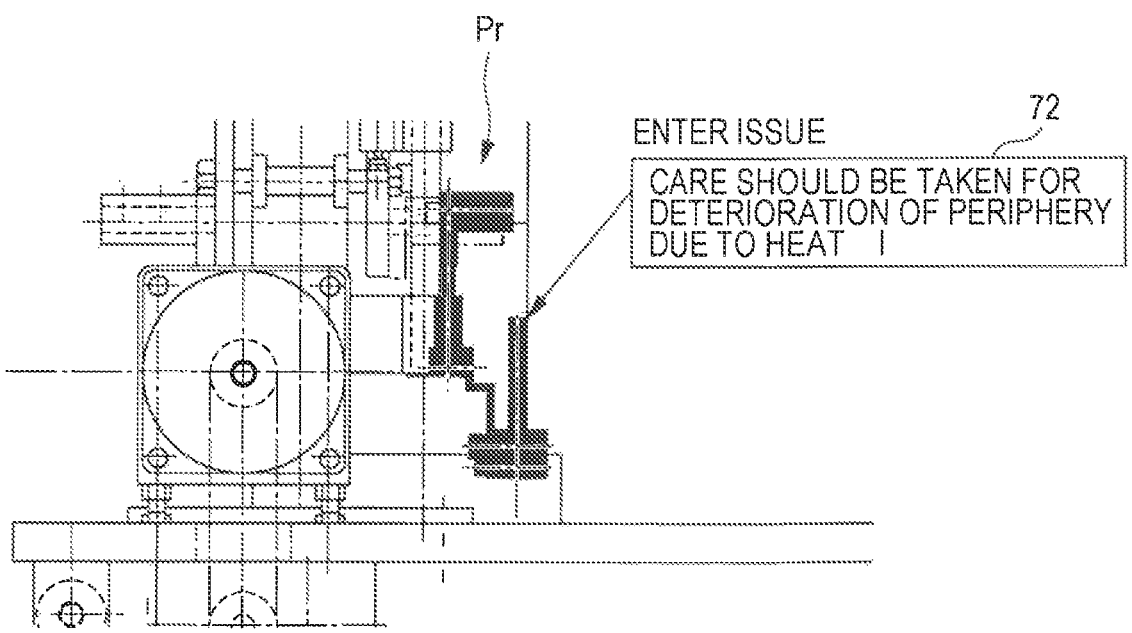

When the design engineer A has clicked the new issue input button 70, as illustrated in FIG. 5B, an issue input field 72 is displayed so as to input details of the issue on the focused component Pr. The design engineer A inputs text of the details of the issue on the focused component Pr in the issue input field 72.

When the design engineer A has input the details of the issue in the issue input field 72 (or has clicked an "OK" button or the like that is displayed separately after the input), the component number of the focused component Pr and the details of the issue that are input in the issue input field 72 are transmitted to the component information management server 14. The component information registering unit 40 of the component information management server 14 registers the component number and the details of the issue that have been received from the design terminal 16 in the issue table of the issue/measure DB 34 in association with each other.

FIG. 6A illustrates a part of the display screen of the 3D CAD after the design engineer A has input the issue on the focused component Pr. When the issue on the focused component Pr has been input, the input issue is displayed as the known issue. The new issue input button 70 may be displayed continuously. Thus, the design engineer A may also input other issues on the focused component Pr.

The measure to address the issue on the focused component Pr has not been registered in the issue/measure DB 34 yet. Therefore, as illustrated in FIG. 6A, the display screen of the 3D CAD shows that there is no known measure to address the known issue on the focused component Pr. In addition, a new measure input button 74 is displayed on the display screen of the 3D CAD so as to allow the design engineer A to input a new measure to address the issue on the focused component Pr.

When the design engineer A has clicked the new measure input button 74, as illustrated in FIG. 6B, a measure input field 76 is displayed so as to input details of the measure to address the issue on the focused component Pr. In this exemplary embodiment, an addition target component input field 78 is displayed so as to input a component number of an addition target component to be added by taking the measure and a removal target component input field 80 is displayed so as to input a component number of a removal target component to be removed by taking the measure. The design engineer A inputs text of the details of the measure to address the issue on the focused component Pr in the measure input field 76 and the component number in at least one of the addition target component input field 78 and the removal target component input field 80. Although illustration is omitted from FIG. 6B, a detailed information input field may be displayed so as to input detailed information on the measure and the design engineer A may input the detailed information on the measure in the detailed information input field.

When the design engineer A has completed the input of the items relating to the measure (or has clicked an "OK" button or the like that is displayed separately after the input), the component number of the focused component the details of the issue, the details of the measure, the component number of at least one of the addition target component and the removal target component, and a number of a product to which the measure is applied (may be extracted from the data on the 3D CAD) are transmitted to the component information management server 14. The component information registering unit 40 of the component information management server 14 registers a measure ID in the record of the issue table including the component number and the details of the issue that have been received from the design terminal 16 and also registers the measure ID and the details of the measure, at least one of the addition target component and the removal target component, and the number of the applied product that have been received in the measure table in association with each other. When the detailed information on the measure is input, the component information registering unit 40 registers a number of a link to details in the record of the measure table and stores the registered number of the link to details and the received detailed information in the detailed information table in association with each other.

In the manner described above, the issue on the component of the product designed by each design engineer and the measure to address the issue are accumulated in the issue/measure DB 34 by the plural design engineers who are involved in designing by using the design assistance system 10.

Figure 7:
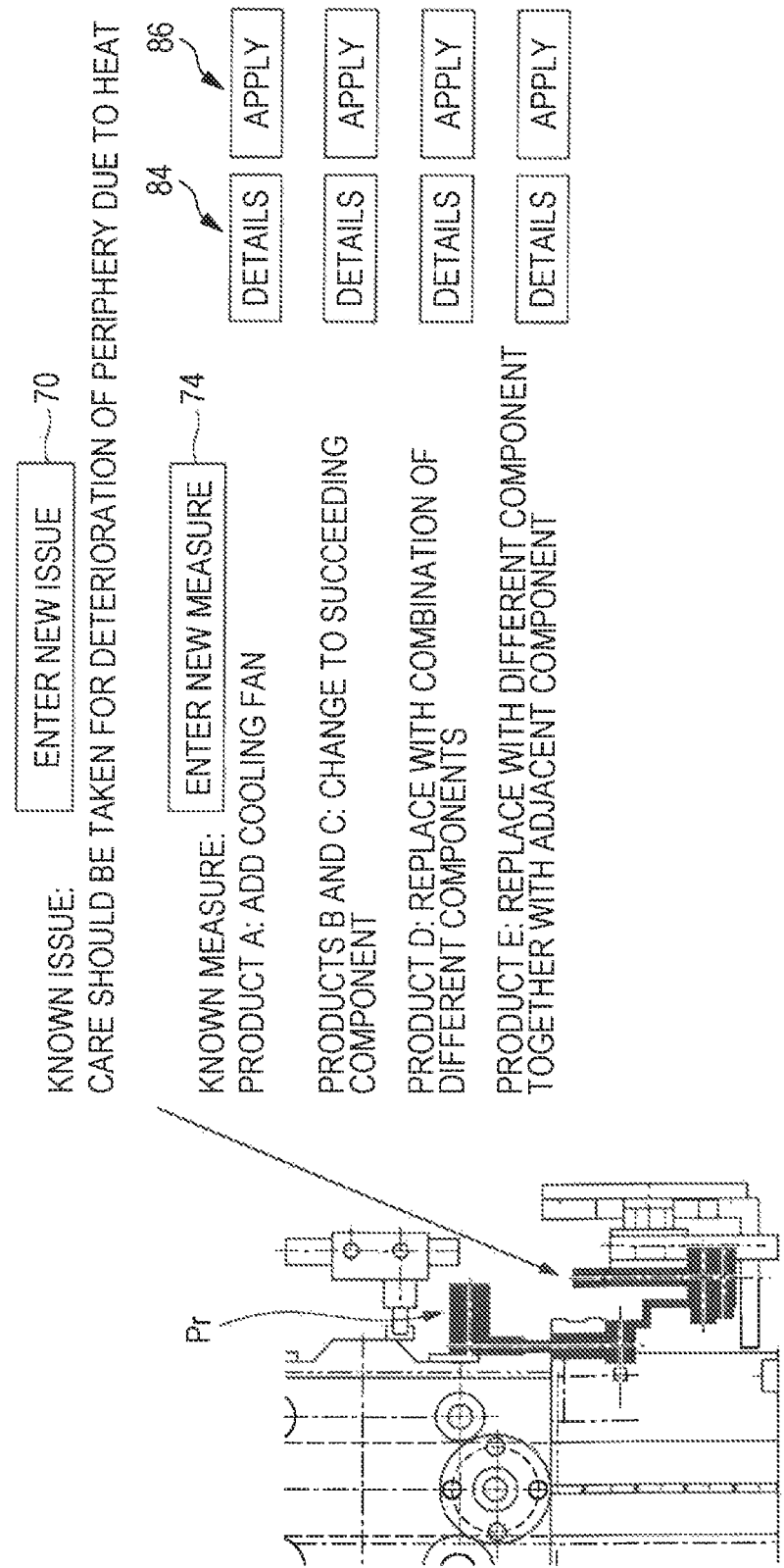
FIG. 7 illustrates an example in which an issue on a focused component and plural measures to address the issue are displayed.

FIG. 7 illustrates a part of the display screen of the 3D CAD that is displayed on the display unit 56 when a design engineer B who designs a product different from that of the design engineer A is involved in designing by using the 3D CAD on the design terminal 16. FIG. 7 illustrates an example of a display screen when the contents illustrated in FIGS. 3A and 3B are registered in the issue/measure DB 34 and the component "AB012C" (component colored black in FIG. 7) is selected as the focused component Pr.

When the component "AB012C" is selected as the focused component Pr in response to an operation performed by the design engineer B on the 3D CAD, the component number of the focused component Pr is transmitted from the design terminal 16 to the component information management server 14. The component information reading unit 42 searches the issue table of the issue/measure DB 34 by setting the received component number as a key and reads the details of the issue and the measure ID associated with the component number "AB012C" from the issue/measure DB 34. In this exemplary embodiment, the plural measure IDs are associated with the component number "AB012C" and therefore the component information reading unit 42 reads the plural measure Ins.

Subsequently, the component information reading unit 42 searches the measure table by setting the measure ID read from the issue table as a key and reads the details of the measure, the removal target component number, the addition target component number, and the applied product associated with the measure ID from the measure table of the issue/measure DB 34. In this exemplary embodiment, the plural measure IDs are read and therefore the component information reading unit 42 reads the details of the measures, the removal target component numbers, the addition target component numbers, and the applied products associated with the respective measure IDs.

The details of the issue, the measure ID, the details of the measure, and the applied product that have been read are transmitted to the design terminal 16 that is used by the design engineer B.

Various types of information received from the component information management server 14 are displayed on the display unit 56 (specifically, the display screen of the 3D CAD) of the design terminal 16 that is used by the design engineer B. Specifically, the issue on the focused component Pr and the measure to address the issue that have been registered in the issue/measure DB 34 are displayed as illustrated in FIG. 7. Thus, the display unit 56 also functions as an issue/measure display.

In this exemplary embodiment, the plural measures are displayed for one issue as illustrated in FIG. 7. It is suitable that the issue on the focused component Pr and the measure to address the issue be displayed in a format associated with the focused component Pr. Also in this case, the new issue input button may be displayed so as to allow the design engineer B to input a new issue on the focused component Pr. Further, the new measure input button 74 may be displayed so as to allow the design engineer B to input a new measure for the known issue.

The measure is displayed in such a format that the product to which the measure is applied is identified clearly. For example, in the example of FIG. 7, the display is made in a format of "PRODUCT A: ADD COOLING FAN". A "DETAILS" button 84 and an "APPLY" button 86 are displayed in association with each measure.

When the design engineer B has clicked the "DETAILS" button 84, a detailed information request is transmitted to the component information management server 14 together with the measure ID of the measure corresponding to the clicked "DETAILS" button 84. When the detailed information request has been received, the component information reading unit 42 reads, from the detailed information table, the detailed information corresponding to the number of the link associated with the measure ID received together and transmits the detailed information to the design terminal 16 that is used by the design engineer B. Then, the received detailed information is displayed on the display screen of the 3D CAD of the design terminal 16.

When the design engineer B has clicked the "APPLY" button 86, the measure corresponding to the clicked "APPLY" button 86 may be applied to the product designed by the design engineer B.

In the design assistance system 10 according to this exemplary embodiment, the issue on the component and the measure to address the issue that have been registered in the issue/measure DB 34 by the design engineer may be transmitted to each design terminal 16 immediately after the registration. That is, the issue or measure registered by each design engineer is reflected in real time on the display screens of the 3D CAD that is used by different design engineers.

When an issue on a focused component and a measure to address the issue are displayed on the display screen of the 3D CAD that is used by a focused design engineer and when a different design engineer has newly registered an issue or measure relating to the focused component in the issue/measure DB 34, the display screen of the 3D CAD that is used by the focused design engineer may be updated automatically.

The focused component selecting unit 60 may select plural focused components from among the components displayed on the display screen of the 3D CAD. It is assumed that a first component and a second component are selected as the focused components. In this case, issues and measures to address the issues may be displayed separately for the first component and the second component. When an issue caused by the first component is registered in the issue/measure DB 34 as an issue on the second component, the display may be made in a format clearly indicating that the issue on the second component is caused by the issue on the first component.

Figure 8:
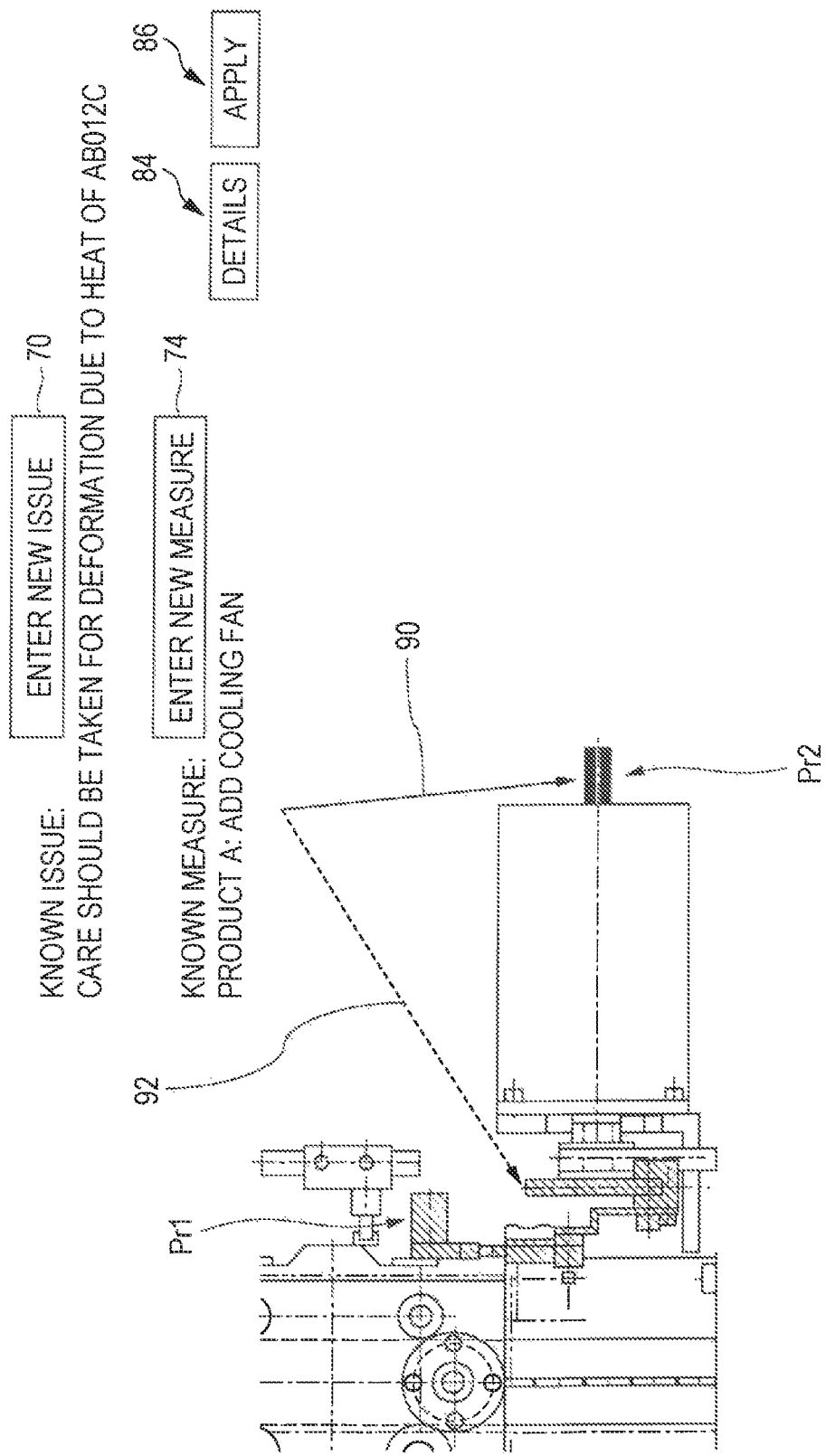
FIG. 8 illustrates an example in which an issue on a second component that is caused by a first component is displayed.

FIG. 8 illustrates an example in which an issue on a second component Pr2 that is caused by a first component Pr1 is displayed. When the first component Pr1 and the second component Pr2 are selected as the focused components, the component information management server 14 transmits various types of information on issues on the first component Pr1 and the second component Pr2 and various types of information on measures to address the issues. Description is made of an exemplary case in which the issue on the second component Pr2 is caused by the first component Pr1. On the display screen of the 3D CAD, an issue "CARE SHOULD BE TAKEN FOR DEFORMATION DUE TO HEAT OF AB012C (that is, the first component)" is displayed as a known issue on the second component Pr2. That is, the issue on the second component that is caused by the first component displayed. Further, a measure "ADD COOLING FAN" is displayed as a measure to address the issue, Although illustration is omitted from FIG. 8, a known issue and a known measure for the first component Pr1 may be displayed at this time.

When the first component Pr1 and the second component Pr2 are selected as the focused components, the first component Pr1, the second component Pr2, and the other components are displayed in distinguishable formats so as to allow the design engineer to grasp the first component Pr1 that causes the issue on the second component Pr2 more easily. In the example of FIG. 8, the first component Pr1 is hatched, the second component Pr2 is colored black, and the other components are outlined. The display of FIG. 8 is one example and the first component, the second component, and the other components may be displayed, for example, in different colors. The second component Pr2 be indicated by an arrow 90 and the first component Pr1 may be indicated by an arrow 92. At this time, it is suitable that the arrow 90 and the arrow 92 be displayed in different formats such that the arrow 90 is displayed as a solid line and the arrow 92 is displayed as a dotted line.

When the first component Pr1 and the second component Pr2 are selected as the focused components, the issue on the first component and the issue caused in the second component by the issue on the first component may be displayed in a format indicating causality between the issue on the first component and the issue caused in the second component by the issue on the first component. In this exemplary embodiment, a chart (diagram) showing the causality between the issue on the first component and the issue on the second component is displayed.

Figure 9:
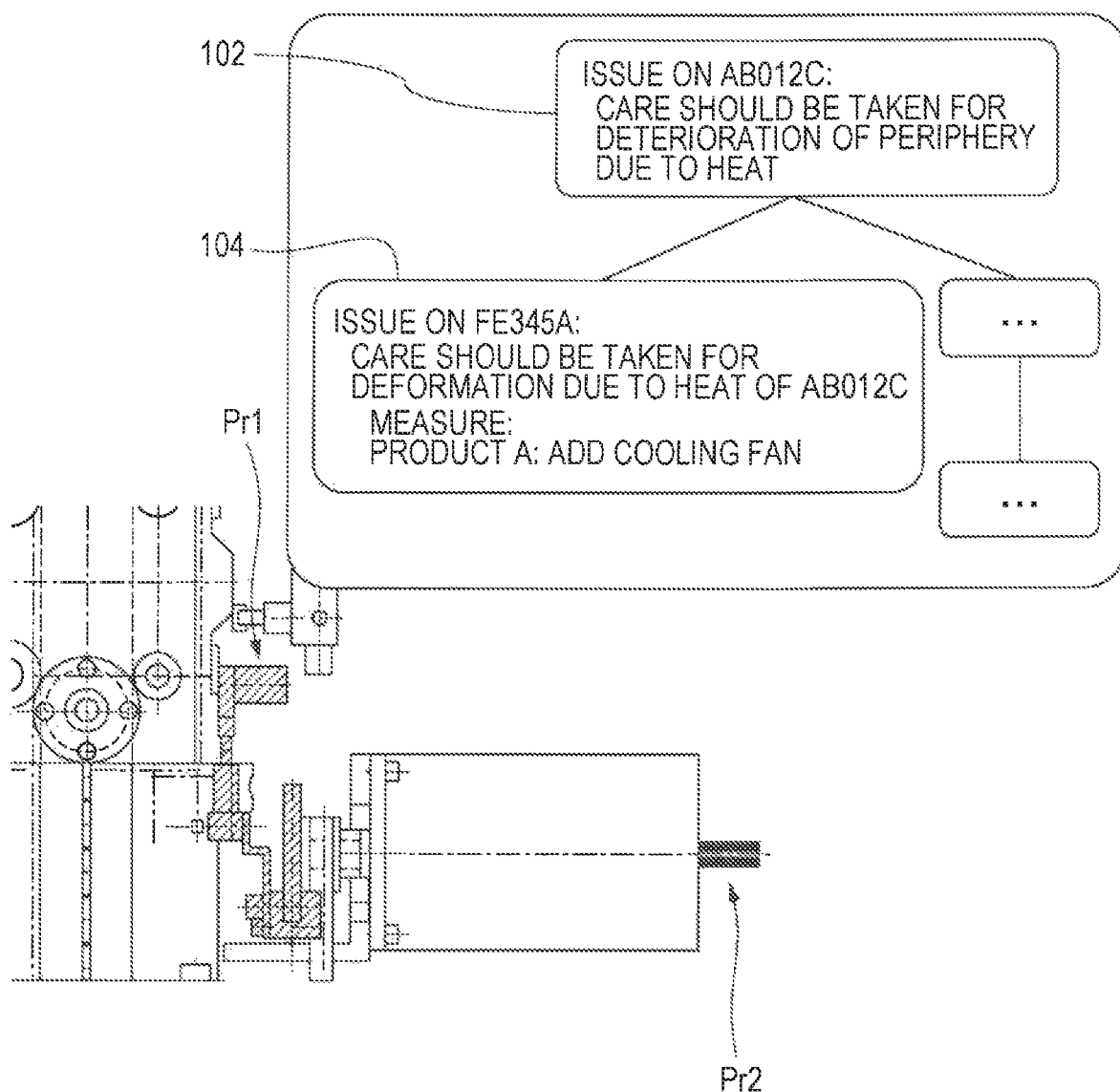
FIG. 9 illustrates an example of a chart showing causality between an issue on the first component and the issue on the second component.

FIG. 9 illustrates an example of the chart showing the causality between the issue on the first component and the issue on the second component. As illustrated in FIG. 9, a chart showing a tree structure is displayed in exemplary embodiment. The tree structure includes a root node 102 indicating the issue on the first component and a child node 104 of the root node 102 that indicates the issue on the second component. A measure to address the issue on the second component may be displayed at the child node 104, The tree structure indicates that the issue on the second component is caused by the issue on the first component. When there is an issue on a different component that is caused by the issue on the first component, another child node may further be displayed with the root node 102 serving as a parent node. The child node may have another child node. That is, the issues may be displayed hierarchically.

As described above, in the design assistance system 10 according to this exemplary embodiment, the component information management server 14 stores an issue on a component and plural measures to address the issue. When a focused component is selected from among components displayed on the 3D CAD and is registered in the component information management server 14, an issue and plural measures associated with the focused component are transmitted from the component information management server 14 and are displayed on the display screen of the 3D CAD.

Figure 10:
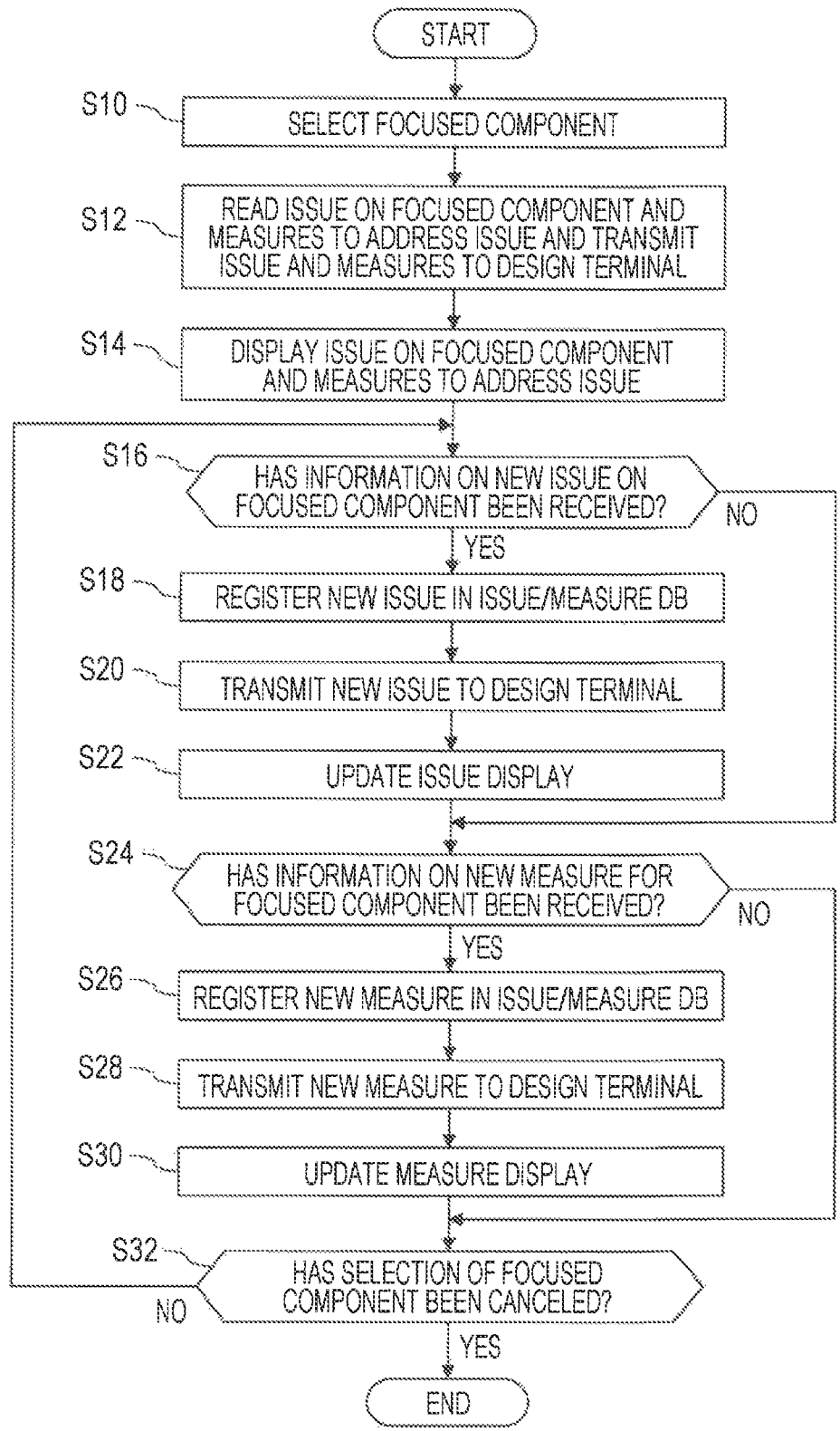
FIG. 10 is a flowchart illustrating a flow of processing performed in the design assistance system according to the exemplary embodiment.

A flow of processing performed in the design assistance system 10 is described below with reference to a flowchart illustrated in FIG. 10.

In Step S10, the focused component selecting unit 60 of the design terminal 16 selects a focused component from among plural components displayed on the display screen of the 3D CAD. A component number of the selected focused component is transmitted to the component information management server 14.

In Step S12, the component information reading unit 42 reads details of an issue and plural measure IDs from the issue table of the issue/measure DB 34 based on the received component number. The component information reading unit 42 also reads details of measures, removal target component numbers, addition target component numbers, and applied products from the measure table based on the plural measure IDs read from the issue table. The component information reading unit 42 transmits those pieces of information to the design terminal 16 that has transmitted the component number in Step S10.

In Step S14, the controller 58 of the design terminal 16 causes the display unit 56 to display the issue on the focused component selected in Step S10 and the measures to address the issue on the display screen of the 3D CAD based on the information received from the component information management server 14.

In Step S16, the component information registering unit 40 determines whether information on a new issue on the focused component (component number of the focused component and details of the issue) has been received from any design terminal 16 included in the design assistance system 10. That is, the component information registering unit 40 determines whether any design engineer has input a new issue on the focused component. When the information has been received, the processing proceeds to Step S18. When the information has not been received, the processing proceeds to Step S24 while bypassing the processing of Steps S18 to S22.

In Step S18, the component information registering unit registers the new issue in the issue/measure DB 34 based on the received information on the new issue.

In Step S20, the component information reading unit 42 reads the registered new issue from the issue/measure DB 34 and transmits the new issue to the design terminal 16 that has transmitted the component number in Step S10.

In Step S22, the controller 58 of the design terminal 16 updates the details of the issue on the focused component on the display screen of the 3D CAD based on the information received from the component information management server 14.

In Step S24, the component information registering unit 40 determines whether information on a new measure for the focused component (component number of the focused component, details of the measure, and the like) has been received from any design terminal 16 included in the design assistance system 10. That is, the component information registering unit 40 determines whether any design engineer has input a new measure for the focused component. When the information has been received, the processing proceeds to Step S26.
When the information has not been received, the processing proceeds to Step S32 while bypassing the processing of Steps S26 to S30.

In Step S26, the component information registering unit 40 registers the new measure in the issue/measure DB 34 based on the received information on the new measure.

In Step S28, the component information reading unit 42 reads the registered new measure from the issue/measure DB 34 and transmits the new measure to the design terminal 16 that has transmitted the component number in Step S10.

In Step S30, the controller 58 of the design terminal 16 updates the details of the measure to address the issue on the focused component on the display screen of the 3D CAD based on the information received from the component information management server 14.

Step S32, the focused component selecting unit 60 determines whether the selection of the focused component has been canceled through an operation performed by the design engineer. When the selection has not been canceled, the processing returns to Step S16 and the processing of Steps S16 to S30 is repeated as long as the focused component is selected. When the selection has been canceled, the processing is terminated.

Although the exemplary embodiment of the present invention is described above, the exemplary embodiment of the present invention is not limited to the exemplary embodiment described above and various modifications may be adopted.

For example, in this exemplary embodiment, the design assistance tool providing server 12 provides the 3D CAD. The design assistance tool to be used by the design engineer may be installed in the design terminal 16.

This exemplary embodiment provides the server-client system including the component information management server 14 that accumulates issues and measures, and the design terminal 16 that displays an issue and plural measures associated with a focused component on the display screen of the 3D CAD. The exemplary embodiment of the present invention is also applicable to a single design assistance apparatus. In this case, the design assistance apparatus has the functions of the issue/measure DB 34, the component information registering unit 40, the component information reading unit 42, and the respective units of the design terminal 16. A storage unit of the design assistance apparatus stores a design assistance program for operating the respective units of the design assistance apparatus. The design assistance apparatus exerts the functions described above based on the design assistance program.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A design assistance system, comprising:
a component information management server comprising an issue/measure information memory that cumulatively stores a component to be used in a design assistance tool, an issue on the component, and a measure to address the issue in association with each other based on inputs from a plurality of design engineers; and
a design terminal comprising an issue/measure display that displays, when a focused component that is the component stored in the issue/measure information memory is displayed on a display screen of the design assistance tool while designing is conducted by using the design assistance tool, an issue on the focused component and a measure to address the issue on the focused component that are received from the component information management server,
wherein the focused component is a plurality of focused components including a first focused component and a second focused component, and the issue/measure display displays the first focused component, the second focused component, and other components in distinguishable formats on the display screen of the design assistance tool.

2. The design assistance system according to claim 1, wherein the design terminal further comprises a focused component selecting unit that selects the focused component from among a plurality of components displayed on the display screen of the design assistance tool.

3. The design assistance system according to claim 2, wherein the focused component selecting unit selects, as the focused component, a component whose display area on the display screen of the design assistance tool is equal to or larger than a predetermined area.

4. The design assistance system according to claim 1,
wherein the issue/measure information memory stores the second focused component, an issue caused in the second focused component by an issue on the first focused component, and a measure to address the issue caused in the second focused component by the issue on the first focused component in association with each other, and
wherein the issue/measure display displays the issue caused in the second focused component by the issue on the first focused component and the measure to address the issue caused in the second focused component by the issue on the first focused component.

5. The design assistance system according to claim 4, wherein the issue/measure display displays the issue on the first focused component and the issue caused in the second focused component by the issue on the first focused component in a format indicating causality between the issue on the first focused component and the issue caused in the second focused component by the issue on the first focused component.

6. A design assistance apparatus, comprising:
an issue/measure information memory that cumulatively stores a component to be used in a design assistance tool, an issue on the component, and a measure to address the issue in association with each other based on inputs from a plurality of design engineers; and
an issue/measure display that displays, when a focused component that is the component stored in the issue/measure information memory is displayed on a display screen of the design assistance tool while designing is conducted by using the design assistance tool, an issue on the focused component and a measure to address the issue on the focused component,
wherein the focused component is a plurality of focused components including a first focused component and a second focused component, and the issue/measure display displays the first focused component, the second focused component, and other components in distinguishable formats on the display screen of the design assistance tool.

7. A non-transitory computer readable medium storing a design assistance program causing a computer to execute a process comprising:
cumulatively storing a component to be used in a design assistance tool, an issue on the component, and a measure to address the issue in association with each other based on inputs from a plurality of design engineers; and
displaying, when a focused component that is the stored component is displayed on a display screen of the design assistance tool while designing is conducted by using the design assistance tool, an issue on the focused component and a measure to address the issue on the focused component,
wherein the focused component is a plurality of focused components including a first focused component and a second focused component, and the displaying displays the first focused component, the second focused component, and other components in distinguishable formats on the display screen of the design assistance tool.

* * * * *